(12) United States Patent
Tam et al.

(10) Patent No.: US 9,058,462 B2
(45) Date of Patent: Jun. 16, 2015

(54) SYSTEM AND METHOD FOR LEAKAGE ESTIMATION FOR STANDARD INTEGRATED CIRCUIT CELLS WITH SHARED POLYCRYSTALLINE SILICON-ON-OXIDE DEFINITION-EDGE (PODE)

(71) Applicant: TAIWAN SEMICONDUCTOR MANUFACTURING COMPANY, LTD., Hsinchu (TW)

(72) Inventors: King-Ho Tam, Zhudong Township (TW); Yeh-Chi Chang, Hsinchu (TW); Kuo-Nan Yang, Hsinchu (TW); Zhe-Wei Jiang, Hsinchu (TW); Chung-Hsing Wang, Baoshan Township (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/015,846

(22) Filed: Aug. 30, 2013

(65) Prior Publication Data

US 2015/0067624 A1    Mar. 5, 2015

(51) Int. Cl.
*G06F 17/50*    (2006.01)

(52) U.S. Cl.
CPC .................................. *G06F 17/5081* (2013.01)

(58) Field of Classification Search
CPC ............ G06F 17/5068; G06F 17/5081; G06F 17/5022; G06F 17/504; G06F 17/5036; G06F 17/5045
USPC .................................... 716/51, 106, 111, 133
See application file for complete search history.

(56) References Cited

U.S. PATENT DOCUMENTS

| | | | |
|---|---|---|---|
| 8,176,445 B1* | 5/2012 | Qian ............................... 716/52 |
| 2005/0197816 A1* | 9/2005 | Inukai et al. .................... 703/14 |
| 2006/0010407 A1* | 1/2006 | Terai et al. ........................ 716/5 |
| 2006/0173667 A1* | 8/2006 | Sumikawa ....................... 703/14 |

* cited by examiner

Primary Examiner — Vuthe Siek
(74) Attorney, Agent, or Firm — Lowe Hauptman & Ham, LLP

(57) ABSTRACT

A system and method of producing an integrated circuit using abutted cells having shared polycrystalline silicon on an oxide definition region edge (PODE) includes modeling inter-cell leakage current in a plurality of different cells. Each of the plurality of different cells is abutted with another cell and having the shared PODE. The method also comprises verifying a pre-determined acceptable power consumption of the integrated circuit based on the inter-cell leakage current.

20 Claims, 6 Drawing Sheets

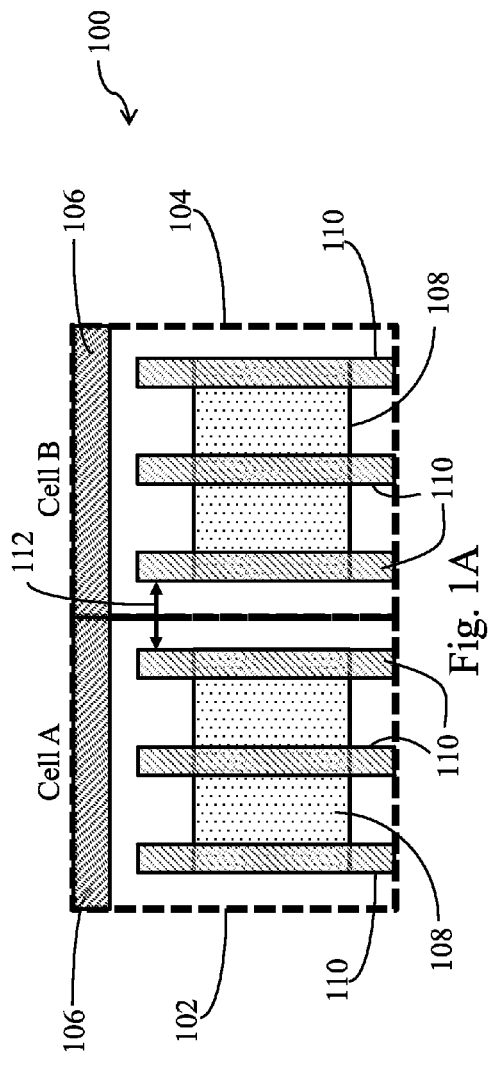
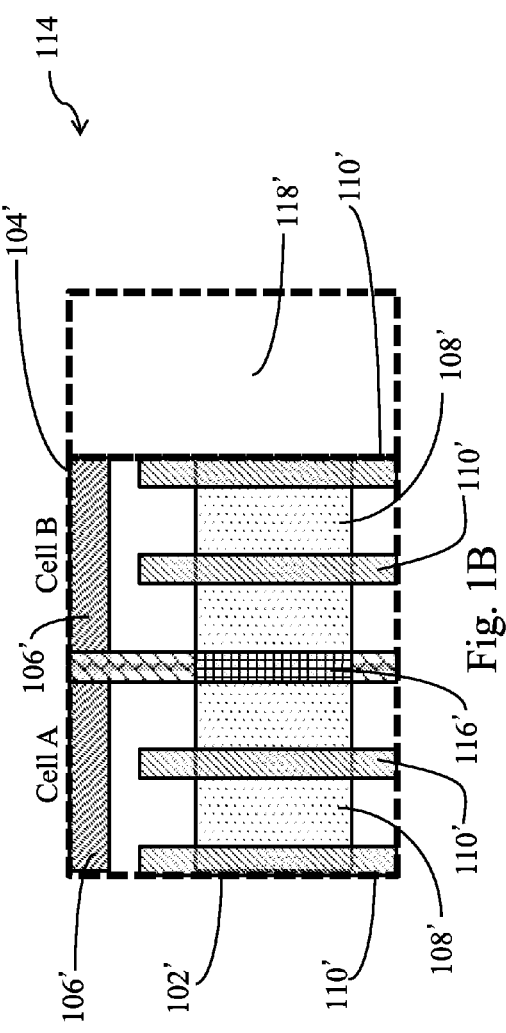

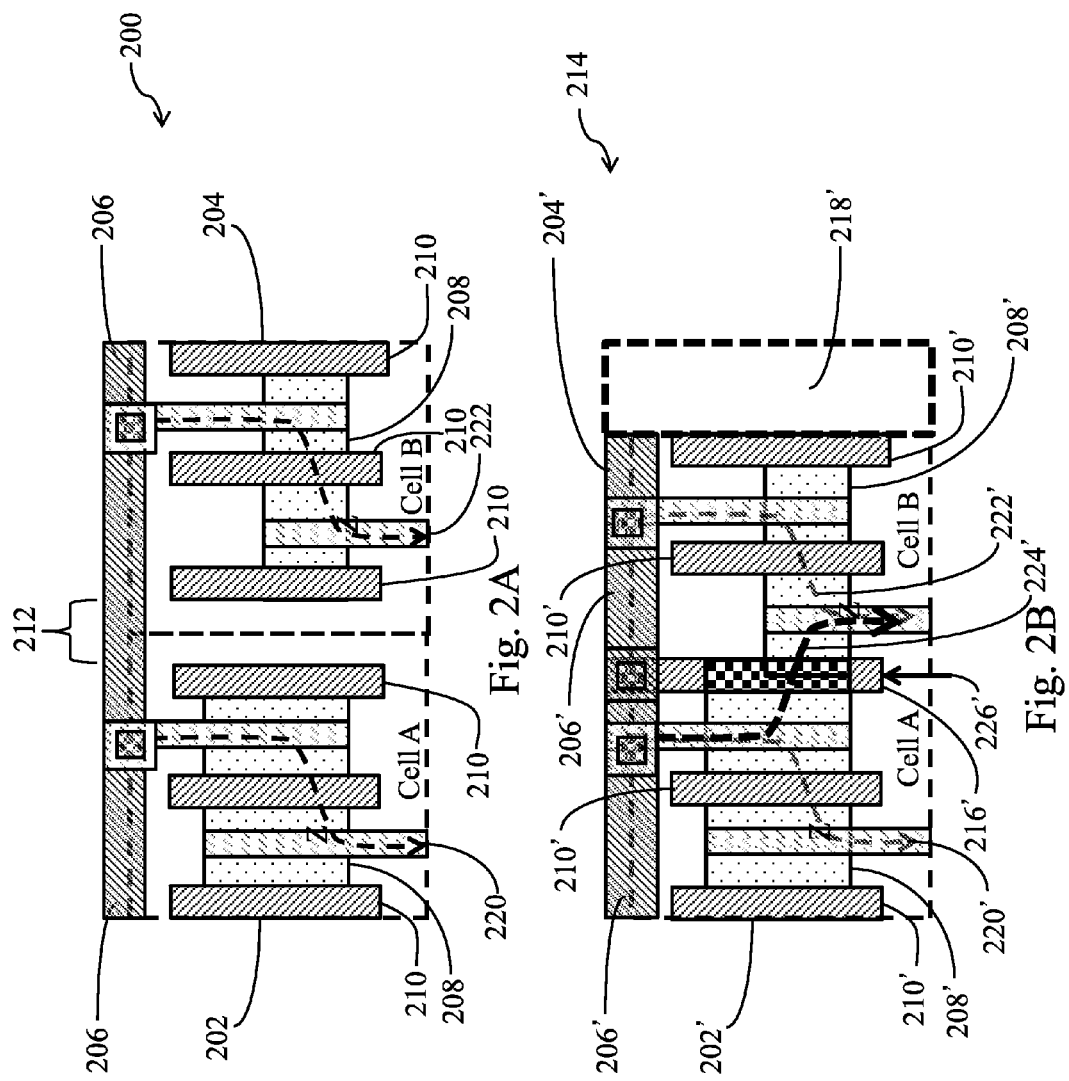

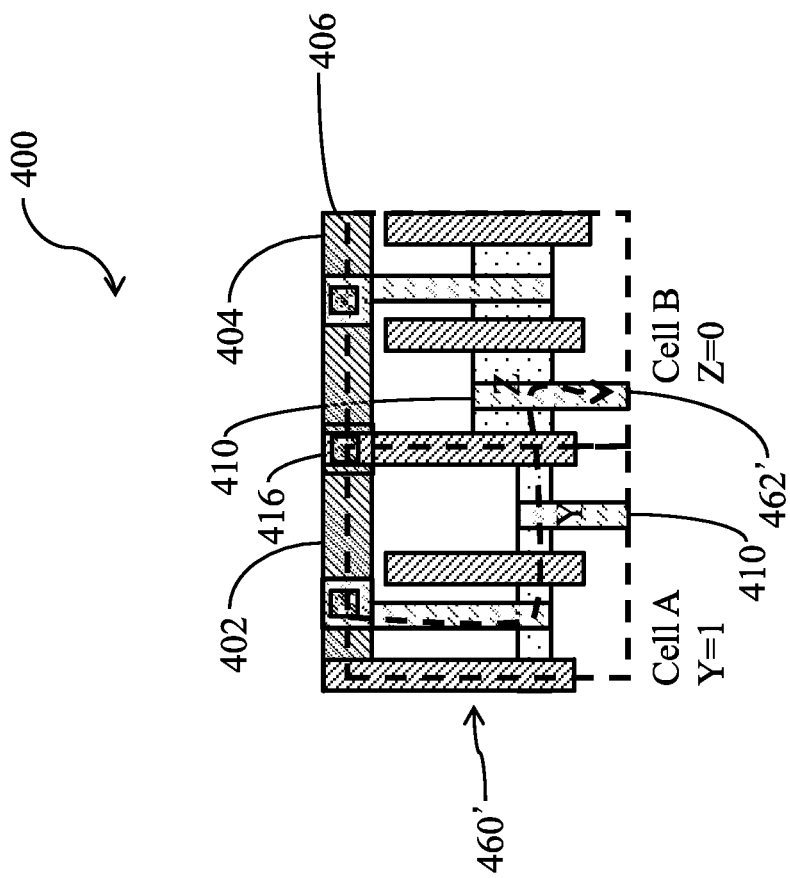
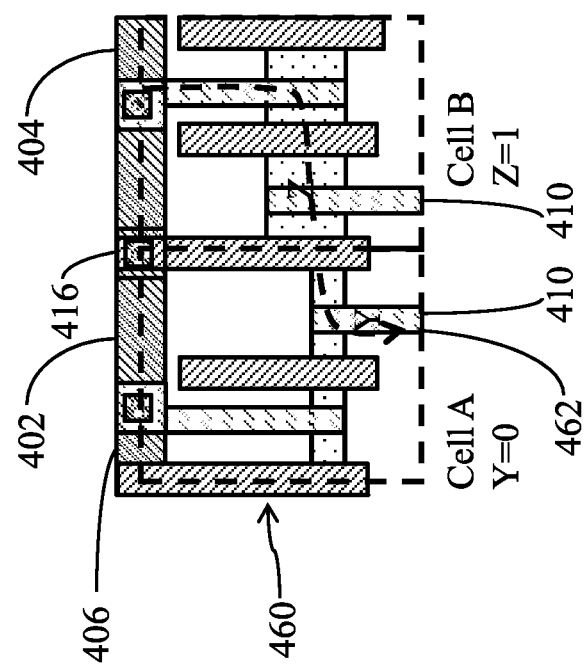
Fig. 4B
Fig. 4A

SYSTEM AND METHOD FOR LEAKAGE ESTIMATION FOR STANDARD INTEGRATED CIRCUIT CELLS WITH SHARED POLYCRYSTALLINE SILICON-ON-OXIDE DEFINITION-EDGE (PODE)

BACKGROUND

Integrated circuit (IC) process limitations associated with decreasing minimum feature size tend to favor dummy polycrystalline silicon (poly) segments formed on edges of a silicon oxide definition (OD) region such as an active region of a standard cell, i.e., poly-on-OD-edge (PODE). PODE helps to ensure that active poly fingers are properly formed and performance degradation due to faceting of transistors near the edges of the OD region is prevented. For example, abutted standard cells may include active poly segments in two PODEs.

If two standard cells are abutted to one another, such as a cell A and a cell B are abutted, the PODE and the OD region of cell A and the PODE and the OD region of cell B are separated in order to prevent inter-cell leakage current flowing between the two abutted cells. Intra-cell current leakage occurs if the abutted standard cells have separated independent PODEs, and OD regions, and inter-cell leakage current is essentially negligible. However, separated standard cells use extra spacing between OD regions of the two abutted standard cells, which correspondingly incurs additional IC area penalty.

BRIEF DESCRIPTION OF THE DRAWINGS

Reference is now made to the following descriptions taken in conjunction with the accompanying drawings, in which:

FIG. 1A is a top view of abutted standard cells without PODE according to an embodiment;

FIG. 1B is a top view of abutted standard cells with PODE according to an embodiment;

FIG. 2A is a top view of modeled abutted cells without PODE according to an embodiment;

FIG. 2B is a top view of modeled abutted cells with PODE in a Source-Drain configuration according to an embodiment;

FIG. 4A is a top view of modeled abutted cells with PODE in a Drain-Drain configuration having a first inter-cell leakage current according to an embodiment;

FIG. 4B is a top view of the modeled abutted cells with PODE in the Drain-Drain configuration in FIG. 4A having a second inter-cell leakage current;

DETAILED DESCRIPTION

Figure 3A:
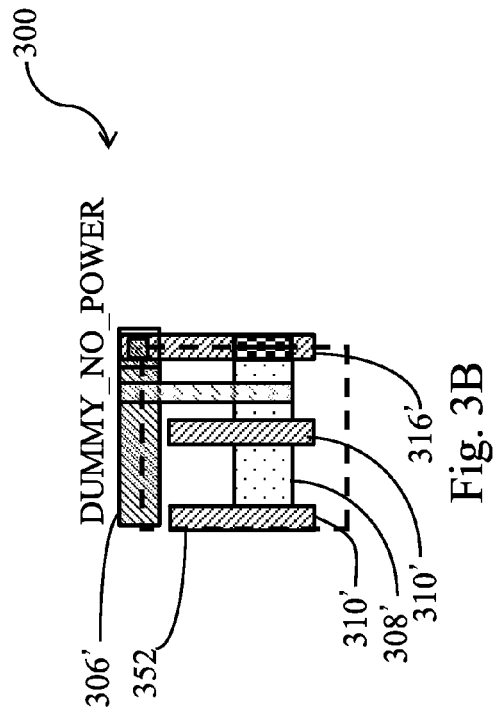
FIG. 3A is a top view of a modeled dummy power cell with PODE according to an embodiment.

The making and using of various embodiments are discussed in detail below. It should be appreciated; however, that the present disclosure provides many applicable inventive concepts that can be embodied in a wide variety of specific contexts. The specific embodiments discussed are examples of specific ways to make and use, and do not limit the scope of the disclosure.

In addition, the present disclosure may repeat reference numerals and/or letters in the various examples or designate corresponding components with same last two digits, but with a different preceding digit or digits. This repetition is for the purpose of simplicity and clarity of identification of corresponding objects and does not necessarily in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "below," "up," "down," "top," "bottom," and similar terms as well as derivatives thereof (e.g., "horizontally," "downwardly," "upwardly," and similar.) are used for ease of the present disclosure of one feature in relation to another feature. The spatially relative terms are intended to cover different orientations of the device including the features. Note that the Figures herein illustrate p-type metal oxide semiconductor (PMOS) transistors, but some embodiments employ n-type metal oxide semiconductor (NMOS) transistors or combinations of PMOS and NMOS.

FIG. 1A is a top view of abutted standard cells in an integrated circuit (IC) without PODE 100. FIG. 1A in conjunction with FIG. 1B illustrates space consumed between the abutted cells as a tradeoff to mitigate or eliminate inter-cell leakage current. A standard cell A 102 abuts a standard cell B 104. Both cell A 102 and cell B 104 share voltage source VDD 106 extending horizontally across the upper margin of the cells. However, cell A 102 and cell B 104 each include physically separated oxide definition (OD) regions 108 extending horizontally across the middle of the cells and physically separated polycrystalline silicon (poly) lines 110 extending vertically within the cells. Between the rightmost poly line 110 in cell A 102 and the leftmost poly line 110 in cell B 104, a gap 112 exists to prevent or mitigate inter-cell current leakage. Although gap 112 reduces or prevents inter-cell current leakage by electrically isolating cells 102, 104, the gap comes at the cost of additional area consumed. Note that for clarity and uniformity in illustrating the gap 112, cell A 102 and cell B 104 are illustrated as generic standard cells prior to "programming", i.e., the inclusion of connections to power (VDD), ground and/or other cells.

FIG. 1B is a top view of abutted standard cells with PODE 114. A standard cell A 102' abuts a standard cell B 104' and each share a voltage source VDD 106'. However, unlike abutted standard cells without PODE 100 in FIG. 1A, in abutted standard cells with PODE 114, cell A 102' and cell B 104' share contiguous oxide definition (OD) regions 108' and a common PODE poly line 116'. Cell A 102' and cell B 104' also retain some individual poly lines 110'. IC area is saved by abutted standard cells 102',104' with PODE 114, as compared with abutted standard cells without PODE 100 in FIG. 1A, and results in saved space 118'. Note that prime designations (') used with reference numbers indicate corresponding, but not necessarily identical, structure between identical reference numerals in different figures, e.g., cell A 102 in FIG. 1A and cell A 102' in FIG. 1B, as described herein. Similarly, reference numbers incremented by 100 indicate corresponding, but not necessarily identical, structure between reference numerals in different figures, e.g., cell A 102 in FIG. 1A and cell A 202 in FIG. 2A, as described herein.

FIG. 2A is a top view of modeled abutted standard cells in an integrated circuit (IC) without PODE 200. FIG. 2A in conjunction with FIG. 2B illustrates inter-cell leakage current incurred between the abutted cells in addition to intra-cell leakage currents as a tradeoff to reduce area consumed. A standard cell A 202 abuts a standard cell B 204. Both cell A 202 and cell B 204 share a voltage source VDD 206 extending horizontally across the upper margin of the cells. However, cell A 202 and cell B 204 each include physically separated oxide definition (OD) regions 208 extending horizontally across the middle of the cells and physically separated polycrystalline silicon (poly) lines 210 extending vertically within the cells. Between the rightmost poly line 210 in cell A 202 and the leftmost poly line 210 in cell B 204, there is a gap 212. As described above with regard to FIG. 1A, the gap 112 exists to prevent or mitigate inter-cell current leakage. Cell A intra-cell current leakage 220 passes through a PMOS transistor in cell A 202. Similarly, cell B intra-cell current leakage 222 passes through a PMOS transistor in cell B 204. Note that for clarity and uniformity in illustrating leakage currents, cell A 202 and cell B 204 are illustrated as simple standard cells each having a single transistor electrically coupled to VDD 206 with a single output.

FIG. 2B is a top view of modeled abutted standard cells with PODE 214. Standard cell A 202' abuts standard cell B 204' and each share VDD 206'. However, unlike abutted standard cells without PODE 200 in FIG. 2A, in abutted standard cells with PODE 214, cell A 202' and cell B 204' share contiguous oxide definition (OD) regions 208' and a common PODE poly line 216'. Cell A 202' and cell B 204' also retain some individual poly lines 210'. IC area is saved by abutted standard cells 202',204' with PODE 214, as compared with abutted standard cells without PODE 200 in FIG. 2A, and results in saved space 218'. Cell A intra-cell current leakage 220' passes through a PMOS transistor in cell A 202'. Similarly, cell B intra-cell current leakage 222' passes through a PMOS transistor in cell B 204'. However, unlike FIG. 2A, an inter-cell leakage current 224' comes from a source terminal in cell A 202' through the contiguous OD 208' under the PODE poly line 216' through a drain terminal in cell B 204'. Current leakage from the source terminal in cell A 202' is from a "source edge," while current leakage to the drain terminal in cell 204' is from a "drain edge." The inter-cell leakage current 224' flows out of the same drain terminal as cell B intra-cell current leakage 222'. The inter-cell leakage current 224' in cells with PODE 214 is not considered to have a comparable counterpart in cells without PODE 200 and is a tradeoff for saved space 218'. Note that a small additional gate leakage current 226' is considered to be part of the inter-cell leakage current 224'.

While inter-cell leakage current 224' is a consequence of the saved space 218' in abutted cells with PODE 214, inter-cell leakage current 224' is still an acceptable tradeoff if simulation models accurately account for the additional leakage current. Unfortunately, present current leakage models do not account for current leakage due to shared PODE. Present current leakage models only consider intra-cell leakage current, e.g. 220' and 222', but do not consider inter-cell leakage current 224'.

FIGS. 3A-3D are top views of a modeled dummy power cell with PODE, a modeled dummy no power cell with PODE, and a modeled cell A with PODE, in various combinations 300. Modeling of static power consumption in abutted cells with PODE depends on the context of cell abutment, which affects inter-cell leakage current, so modeling of different leakage currents through shared PODE depends on each abutted cell's OD width and threshold voltage. For example, the through-PODE leakage sourcing from a high driving, ultra-low threshold voltage cell and that from a weak driving, high threshold voltage cell to a particular standard cell under consideration can be significantly different. Because standard cell design includes multiple OD widths and multiple threshold voltages, each possible combination for abutted cells is modeled and stored in a 2D lookup table. For example, in some embodiments there are 7 different OD widths and 6 different threshold voltage values yielding 42 different combinations of abutted cell models available in the standard cells. Other combinations, such as abutted NMOS cells, are modeled in some embodiments.

FIG. 3A is a top view of a modeled dummy power cell with PODE. A dummy power cell 350 is used to model a cell having power from VDD 306. The dummy power cell 350 has as OD area 308 and poly lines 310. PODE 316 is electrically coupled to VDD 306 to minimize leakage current between abutted cells in PMOS as described above. In some embodiments, dummy power cell 350 is NMOS instead of PMOS and PODE 316 is electrically coupled to ground instead of VDD 306.

Figure 3B:
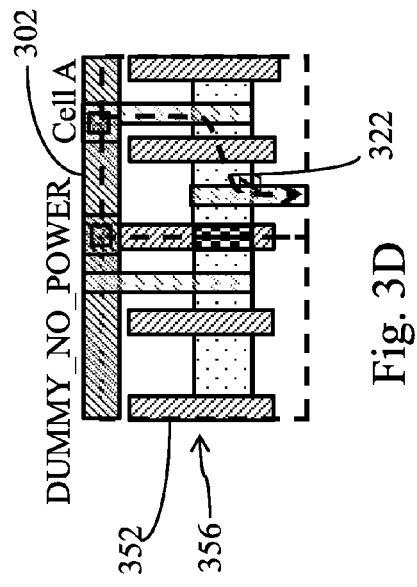
FIG. 3B is a top view of a modeled dummy no power cell with PODE according to an embodiment.

FIG. 3B is a top view of a modeled dummy no power cell with PODE. A dummy no power cell 352 is used to model a cell not having power from VDD 306'. The dummy no power cell 352 has as OD area 308' and poly lines 310'. PODE 316' is electrically coupled to VDD 306' to minimize leakage current between abutted cells in PMOS as described above. In some embodiments, the dummy no power cell 352 is NMOS instead of PMOS and PODE 316' is electrically coupled to ground instead of VDD 306'.

Figure 3C:
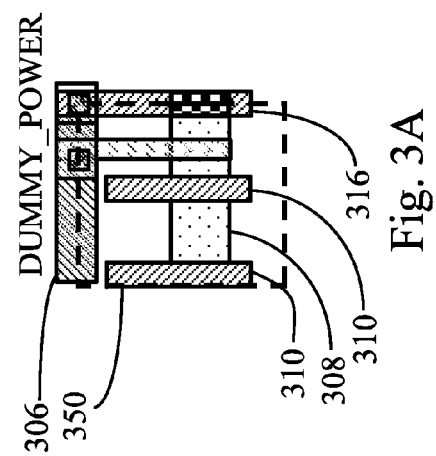
FIG. 3C is a top view of modeled abutted cells including a dummy power cell with PODE according to an embodiment.

FIG. 3C is a top view of modeled abutted cells including a dummy power cell with PODE. The dummy power cell 350, having a specific OD width and voltage threshold, abuts cell A 302. Cell A 302 also has a specific OD width and voltage threshold. Inter-cell leakage current 324 passes from a source edge in the dummy power cell 350 through the PODE 316 to a drain edge in cell A 302. Modeling of the dummy power cell with PODE 350 and cell A includes static power consumption associated with intra-cell leakage current 322 and inter-cell leakage current 324.

Figure 3D:
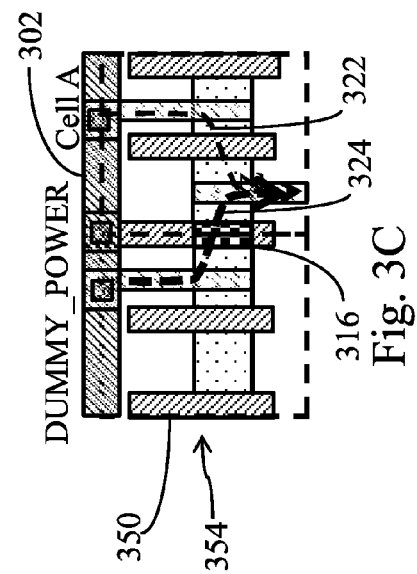
FIG. 3D is a top view of modeled abutted cells including a dummy no power cell with PODE according to an embodiment.

FIG. 3D is a top view of modeled abutted cells including a dummy no power cell with PODE. A dummy no power cell 352 having a specific OD width and voltage threshold abuts cell A 302. As before, cell A 302 also has a specific OD width and voltage threshold. While intra-cell leakage current 322 still exists, inter-cell leakage current 324 is not treated as being significant. Modeling of the dummy no power cell with PODE 352 and cell A includes static power consumption associated with intra-cell leakage current 322, but not inter-cell leakage current 324. In some embodiments, a static power tester compares estimated overall static power consumption associated with intra-cell leakage current 322 with a pre-determined acceptable power consumption of the integrated circuit.

FIGS. 4A and 4B are top views of modeled abutted cells with PODE in a Drain-Drain configuration having first and second inter-cell leakage current 400. Both first and second inter-cell leakage currents occur in different logical situations that are modeled in the Drain-Drain configuration.

FIG. 4A is a top view of modeled abutted cells with PODE in a Drain-Drain configuration having a first inter-cell leakage current. A cell A 402 with poly lines 410 is abutted with a cell B 404 with poly lines 410. Unlike the PMOS source-drain configuration modeled in FIG. 2B, the rightmost poly line 410 in cell A 402 is a PMOS drain and the leftmost poly line 410 in cell B 404 is also a PMOS drain. In this model, cell B 404 is in an ON state (logical one), designated by drain Z being electrically coupled to VDD inside cell B, and cell A 402 is in an OFF state (logical zero), designated by drain Y not being electrically coupled to VDD inside cell A. However, inter-cell leakage current 462 is modeled as flowing from VDD 406 inside cell B 404 to drain Y in cell A 402. Inter-cell leakage current 462 passes from a source terminal electrically coupled to VDD inside cell B 404, below PODE 416, to drain terminal Y inside cell A 402. While most of the current from VDD 406 in cell B 404 is passing through drain Z in cell B, some current is inter-cell leakage current 462 passing through drain Y in cell A 402. Inter-cell leakage current 462 in abutted cells 460 is modeled as occurring in this situation because of the OFF state of cell A 402 in conjunction with the ON state of cell B 404.

FIG. 4B is a top view of the modeled abutted cells with PODE in the Drain-Drain configuration in FIG. 4A having a second inter-cell leakage current. Unlike in FIG. 4A, in this model, cell A 402 is in an ON state, designated by drain Y being electrically coupled to VDD inside cell A, and cell B 404 is in an OFF state, designated by drain Z not being electrically coupled to VDD inside cell B. Inter-cell leakage current 462' is modeled as flowing from VDD 406 inside cell A 402 to drain Z in cell B 404. Inter-cell leakage current 462' passes from a source terminal electrically coupled to VDD inside cell A 402, below PODE 416, to drain terminal Z inside cell B 404. While most of the current from VDD 406 in cell A 402 is passing through drain Y in cell A, some inter-cell leakage current 462' is passing through drain Z in cell B 404. Inter-cell leakage current 462 in abutted cells 460 is modeled as occurring in this situation because of the ON state of cell A 402 in conjunction with the OFF state of cell B 404.

Figure 5:
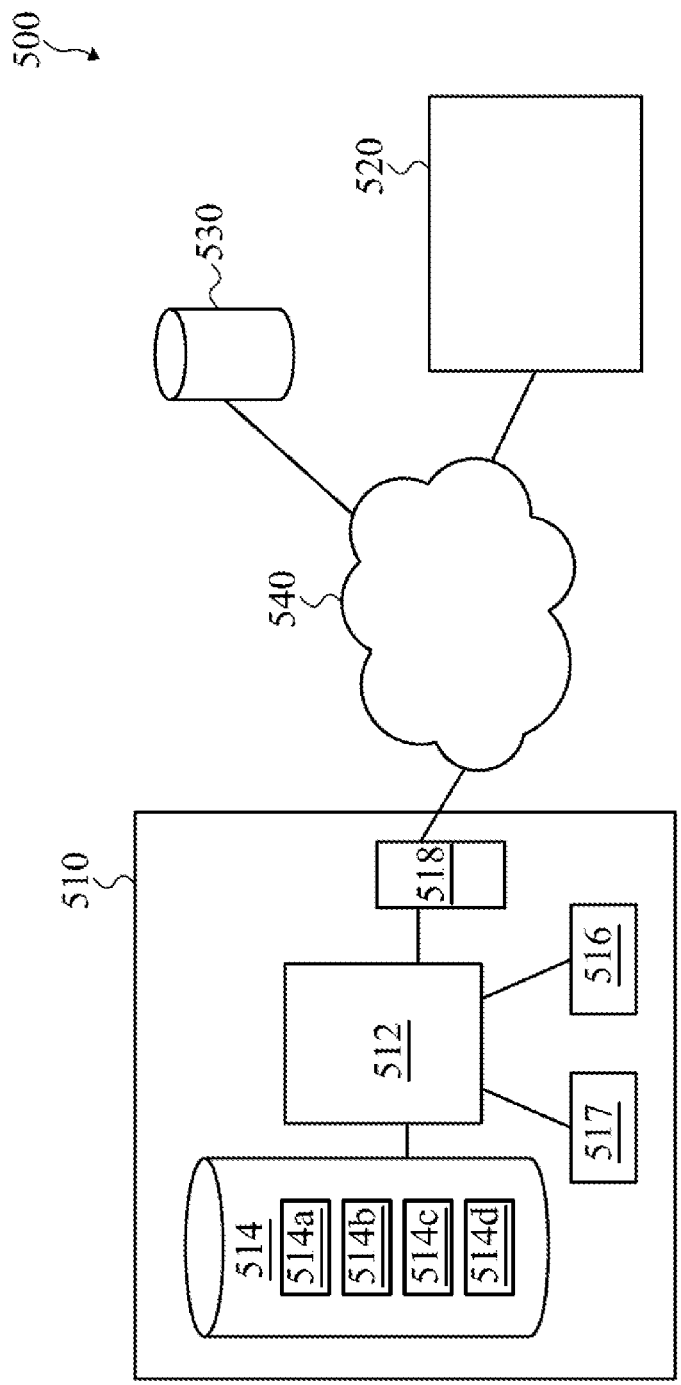
FIG. 5 is a functional block diagram of an integrated circuit design and modeling system 500 in accordance with an embodiment.

FIG. 5 is a functional block diagram of an integrated circuit design and modeling system 500 in accordance with an embodiment. Integrated circuit design and modeling system 500 includes a first computer system 510, a second computer system 520, a networked storage device 530, and a network 540 connecting the first computer system 510, the second computer system 520, and the networked storage device 530. In some embodiments, one or more of the second computer system 520, the storage device 530, and the network 540 are omitted. In some embodiments, two or more of the first computer system 510, second computer system 520, and/or storage device 530 are combined into a single computer system.

The first computer system 510 includes a hardware processor 512 communicatively coupled with a non-transitory, computer readable storage medium 514 encoded with, i.e., storing, a generated integrated layout 514a, a circuit design 514b, a computer program code 514c, i.e., a set of executable instructions, and a standard cell library 514d having layout patterns as described herein. The processor 512 is electrically and communicatively coupled with the computer readable storage medium 514. The processor 512 is configured to execute the set of instructions 514c encoded in the computer readable storage medium 514 in order to cause the computer 510 to be usable as a placing and routing tool for generating a layout design based on the standard cell library 514d.

In some embodiments, standard cell library 514d is stored in a non-transitory storage medium other than storage medium 514. In some embodiments, standard cell library 514d is stored in a non-transitory storage medium in networked storage device 530 or second computer system 520. In such case, standard cell library 514d is accessible by the processor 512 through the network.

In some embodiments, the processor 512 is a central processing unit (CPU), a multi-processor, a distributed processing system, an application specific integrated circuit (ASIC), and/or a suitable processing unit.

In some embodiments, the computer readable storage medium 514 is an electronic, magnetic, optical, electromagnetic, infrared, and/or a semiconductor system (or apparatus or device). For example, the computer readable storage medium 514 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 514 includes a compact disk-read only memory (CD-ROM), a compact disk-read/write (CD-R/W), and/or a digital video disc (DVD).

The computer system 510 includes, in at least some embodiments, an input/output interface 516 and a display unit 517. The input/output interface 516 is coupled to the controller 512 and allows the circuit designer to manipulate the first computer system 510. In at least some embodiments, the display unit 517 displays the status of executing the placing and routing tool 514a in a real-time manner and provides a Graphical User Interface (GUI). In at least some embodiments, the input/output interface 516 and the display 517 allow an operator to operate the computer system 510 in an interactive manner.

Figure 6:
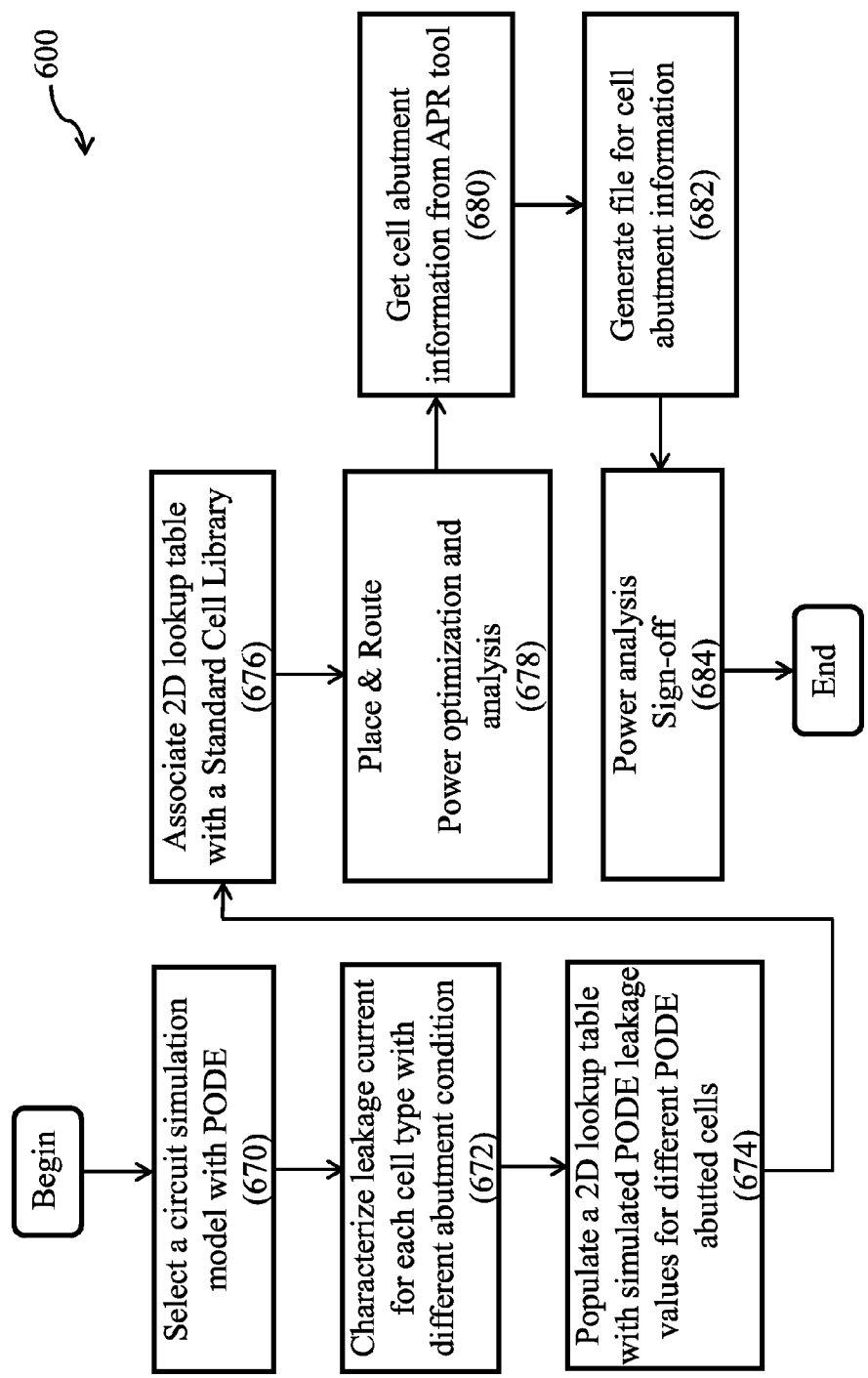
FIG. 6 is a flowchart of a PODE cell modeling method according to an embodiment.

FIG. 6 is a flowchart of a PODE cell modeling method 600 comprising at least a portion of computer program code 514c for execution by processor 512. At operation 670, a circuit simulation model (for example, a Spice circuit simulation model) is selected corresponding to a cell having shared PODE in abutted standard cells. In some embodiments the circuit simulation model is prepared, created and/or modified. The Spice circuit simulation model has a spice simulation port associated with shared PODE. At operation 672, execution of the portion of computer program code 514c by processor 512 causes the processor to use a circuit simulator, e.g., simulation program with integrated circuit emphasis (SPICE), to characterize leakage current for the circuit simulation model selected in operation 670. In at least some embodiments, the circuit simulator uses all combinations of available OD widths and voltage thresholds available in a standard cell library to characterize leakage current. In at least some embodiments, less than all combinations are used. Each of these combinations is characterized with different abutment conditions as described herein.

At operation 674, execution of the portion of computer program code 514c uses all PODE current leakage values generated in operation 672 to populate a 2D lookup table with simulated PODE leakage current values for different PODE abutted cells. In some embodiments, less than all combinations are used to populate the 2D lookup table.

At operation 676, execution of the portion of computer program code 514c associates the 2D lookup table populated in operation 674 with standard cells in the corresponding standard cell library. This enables different power consumption situations to be more accurately modeled by the portion of computer program code 514c from a static power consumption perspective.

At operation 678, place and route operations executed on the portion of computer program code 514c are performed on an IC using standard cells from the standard cell library with abutted cells. A power optimization software routine executed on the portion of computer program code 514c is initiated to reduce power overhead. A static power analysis executed on the portion of computer program code 514c is then initiated. Both the power optimization and the static power analysis are performed by instructions executed by processor 512.

At operation 680, cell abutment information is received from an Automatic Place and Route (APR) tool by the portion of computer program code 514c. The cell abutment information provides actual cell abutment layout information associated with IC design.

At operation 682, execution of the portion of computer program code 514c generates a file for cell abutment information corresponding to the layout information received from the APR tool. The file is transferred to the power analysis software executing on a computing machine having a programmed processor.

At operation 684, the file from operation 682 is used by the power analysis begun at operation 578 to complete the power analysis. If the power analysis is acceptable, execution of the portion of computer program code 514c causes approval (sign-off) to correspondingly be indicated and the process terminates. Because static power consumption associated with PODE is simulated, pre-determined static power restrictions can be observed and the risks associated with use of PODE in abutted cells better managed.

According to some embodiments, a method of producing an integrated circuit using abutted cells having shared polycrystalline silicon on an oxide definition region edge (PODE) includes modeling inter-cell leakage current in a plurality of different cells, each of the plurality of different cells abutted with another cell and having the shared PODE, and verifying a pre-determined acceptable power consumption of the integrated circuit based on the inter-cell leakage current.

According to some embodiments, a method of producing a design of an integrated circuit having abutted cells with shared polycrystalline silicon on an oxide definition region edge (PODE) includes modeling inter-cell leakage current in a plurality of different cells, each of the plurality of different cells abutted with another cell and having the shared PODE and simulating static power consumption of the design of the integrated circuit based on the inter-cell leakage current.

According to some embodiments, An integrated circuit verification system executing on a computing machine having a programmed processor includes a plurality of inter-cell leakage current models of abutted cells having shared polycrystalline silicon on an oxide definition region edge (PODE) between the abutted cells, the plurality of inter-cell leakage current models combined with cell abutment information to derive an estimated overall static current leakage and a static power tester, the static power tester comparing the estimated overall static current leakage with a pre-determined acceptable power consumption of the integrated circuit.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure.

The above method embodiment shows exemplary steps, but they are not necessarily required to be performed in the order shown. Steps may be added, replaced, changed order, and/or eliminated as appropriate, in accordance with the spirit and scope of embodiment of the disclosure. Embodiments that combine different claims and/or different embodiments are within the scope of the disclosure and will be apparent to those skilled in the art after reviewing this disclosure.

What is claimed is:

1. A method of producing an integrated circuit using abutted cells having shared polycrystalline silicon on an oxide definition region edge (PODE), comprising:
    modeling, by a processor, inter-cell leakage current in a plurality of different cells, each of the plurality of different cells abutted with another cell and having the shared PODE; and
    verifying a pre-determined acceptable power consumption of the integrated circuit based on the inter-cell leakage current.

2. The method of claim 1, further comprising:
    selecting one or more circuit simulation models corresponding to the plurality of different cells.

3. The method of claim 2, further comprising:
    characterizing the inter-cell leakage current for the plurality of different cells.

4. The method of claim 3, wherein the characterizing includes simulating different combinations of oxide definition (OD) widths and voltage thresholds.

5. The method of claim 4, wherein the characterizing includes simulating a dummy power cell.

6. The method of claim 4, wherein the characterizing includes simulating a dummy no power cell.

7. The method of claim 3, further comprising:
    populating a 2D lookup table with the inter-cell leakage current for the plurality of different cells.

8. The method of claim 7, further comprising:
    retrieving cell abutment information from an automated place and route (APR) tool.

9. A method of producing a design of an integrated circuit having abutted cells with shared polycrystalline silicon on an oxide definition region edge (PODE), comprising:
    modeling, by a processor, inter-cell leakage current in a plurality of different cells, each of the plurality of different cells abutted with another cell and having the shared PODE; and
    simulating static power consumption of the design of the integrated circuit based on the inter-cell leakage current.

10. The method of claim 9, further comprising:
    selecting one or more circuit simulation models corresponding to the plurality of different cells from a predefined set of circuit simulation models.

11. The method of claim 10, further comprising:
    characterizing the inter-cell leakage current for the plurality of different cells.

12. The method of claim 11, wherein the characterizing includes simulating different combinations of oxide definition (OD) widths and voltage thresholds represented in the predefined set of circuit simulation models.

13. The method of claim 12, wherein the characterizing includes simulating a dummy power cell.

14. The method of claim 12, wherein the characterizing includes simulating a dummy no power cell.

15. The method of claim 11, further comprising:
    populating a 2D lookup table with the inter-cell leakage current for the plurality of different cells represented in the predefined set of circuit simulation models.

16. The method of claim 15, further comprising:
retrieving cell abutment information from an automated place and route (APR) tool.

17. An integrated circuit verification system executing on a computing machine having a programmed processor, comprising:
a plurality of inter-cell leakage current models of abutted cells having shared polycrystalline silicon on an oxide definition region edge (PODE) between the abutted cells, the plurality of inter-cell leakage current models combined with cell abutment information to derive an estimated overall static power consumption; and
a static power tester, the static power tester comparing the estimated overall static power consumption with a predetermined acceptable power consumption of the integrated circuit.

18. The integrated circuit verification system of claim 17, wherein the plurality of inter-cell leakage current models include inter-cell leakage current estimates from one or more circuit simulation models.

19. The integrated circuit verification system of claim 18, wherein the plurality of inter-cell leakage current models includes different combinations of oxide definition (OD) widths and voltage thresholds.

20. The integrated circuit verification system of claim 19, wherein the plurality of inter-cell leakage current models includes a 2D lookup table with the inter-cell leakage current for the abutted cells.

* * * * *